(12) United States Patent
Lagarde et al.

(10) Patent No.: US 10,748,432 B2
(45) Date of Patent: Aug. 18, 2020

(54) PILOTING ASSISTANCE SYSTEM OF A PLATFORM, AND ASSOCIATED METHOD

(71) Applicant: DASSAULT AVIATION, Paris (FR)

(72) Inventors: Jérôme Lagarde, Paris (FR); Eric Boulle, Mouries (FR); Marie-Gabrielle Lafoucriere, Antony (FR); Jérôme Barral, Paris (FR)

(73) Assignee: DASSAULT AVIATION, Paris (FR)

( * ) Notice: Subject to any disclaimer, the term of this patent is extended or adjusted under 35 U.S.C. 154(b) by 660 days.

(21) Appl. No.: 14/858,751

(22) Filed: Sep. 18, 2015

(65) Prior Publication Data

US 2016/0086495 A1 Mar. 24, 2016

(30) Foreign Application Priority Data

Sep. 18, 2014 (FR) ...................................... 14 02096

(51) Int. Cl.
| | |
|---|---|
| *G06F 19/00* | (2018.01) |
| *G08G 5/00* | (2006.01) |
| *G01S 13/95* | (2006.01) |
| *B64D 45/00* | (2006.01) |

(52) U.S. Cl.
CPC ........... *G08G 5/0047* (2013.01); *B64D 45/00* (2013.01); *G01S 13/953* (2013.01); *G08G 5/0021* (2013.01); *G08G 5/0091* (2013.01)

(58) Field of Classification Search
CPC .. G08G 5/0047; G08G 5/0021; G08G 5/0091; B64D 45/00

USPC ......................................................... 701/1, 4
See application file for complete search history.

(56) References Cited

U.S. PATENT DOCUMENTS

| | | | | |
|---|---|---|---|---|
| 3,689,741 | A | * | 9/1972 | Bengt Sjoberg ......... B64D 1/04 235/402 |
| 5,491,489 | A | * | 2/1996 | Johnson ................ G01S 13/951 343/779 |
| 5,523,759 | A | | 6/1996 | Gillberg et al. |
| 5,615,118 | A | * | 3/1997 | Frank ..................... G01C 21/16 342/26 B |
| 5,831,570 | A | * | 11/1998 | Ammar ................. F41G 7/2226 342/149 |
| 6,127,944 | A | | 10/2000 | Daly et al. |
| 7,379,014 | B1 | * | 5/2008 | Woodell .................. G01S 13/87 342/29 |

(Continued)

*Primary Examiner* — Ronnie M Mancho
(74) *Attorney, Agent, or Firm* — Davidson, Davidson & Kappel, LLC

(57) ABSTRACT

A piloting assistance system of a platform, and associated method are provided. The system includes a first detector for detecting a windshear able to generate a first alert that the platform is approaching a windshear zone; a second detector for detecting a windshear able to generate a second alert indicating the presence of the platform in the windshear zone; and a guider of the platform. The guider is able to automatically select a first guidance mode when a first alert is generated by the first detector, and to automatically select at least one second guidance mode different from the first guidance mode when a second alert is generated by the second detector. The system includes an information device able to display unified windshear alert information and/or unified information for implementation of a guidance mode, shared by the first alert and the second alert.

12 Claims, 4 Drawing Sheets

(56) References Cited

U.S. PATENT DOCUMENTS

| | | | |
|---|---|---|---|
| 7,417,578 B1* | 8/2008 | Woodell | G01S 7/292 |
| | | | 342/26 B |
| 2002/0075171 A1* | 6/2002 | Kuntman | G01C 23/00 |
| | | | 340/961 |
| 2002/0089432 A1* | 7/2002 | Staggs | G01C 23/00 |
| | | | 340/945 |
| 2006/0155432 A1 | 7/2006 | Brown | |
| 2006/0238376 A1* | 10/2006 | Khatwa | G01C 23/00 |
| | | | 340/970 |

\* cited by examiner

PILOTING ASSISTANCE SYSTEM OF A PLATFORM, AND ASSOCIATED METHOD

The present invention relates to a piloting assistance system of a platform, comprising:
- a first assembly for detecting a windshear including at least one first sensor and one first computer able to generate a first alert that the platform is approaching a windshear zone, based on data received from the first sensor;
- a second assembly for detecting a windshear including at least one second sensor, separate from the first sensor, and a second computer able to generate a second alert that the platform is in the windshear zone, based on data received from the second sensor,
- a guidance unit of the platform.

The platform is advantageously a flying vehicle such as an aircraft, in particular a civilian or military airplane. Alternatively, the platform is a drone.

BACKGROUND

Windshear is a meteorological phenomenon in which sudden inversions in the speed or direction of the wind cause local instabilities.

These highly localized and short-lasting phenomena are potentially dangerous for aircraft, in particular in phases traveling near the ground, in particular during landing or takeoff of the aircraft.

The passage of the aircraft in a windshear zone may create a sharp drop in the lift, requiring immediate actions by the crew of the aircraft to exit the zone safely.

The detection of the potential presence of shear zones in front of the aircraft and the establishment of corresponding guidance actions are therefore highly sought after to ensure flight safety.

To that end, different piloting assistance systems are known. Thus, some systems include a detection unit using a meteorological radar. The radar scans the atmosphere in front of the aircraft, for example by taking Doppler measurements, and predictively determines an alert when approaching a shear zone.

These systems generally comprise a guidance unit for the evolution of the aircraft, such that when an alert for approaching a shear zone is generated by the radar, a guidance mode of the go-around type is provided for landing and takeoff. This guidance mode is implemented by the pilot of the aircraft, by pressing a specific button.

Other detection assemblies, designated by the term "enhanced ground proximity warning system" (EGPWS), in particular use anemometric data such as the airspeed and the vertical speed to determine the presence of the aircraft in a shear zone. The detection assemblies of this type may in particular emit a reactive alert indicating the presence in a shear zone.

In that case, the unit guiding the evolution of the aircraft establishes a particular guidance mode, able to minimize the altitude loss, while maintaining an appropriate flight envelope to avoid stalling.

When these two systems are implemented together in a given aircraft, they therefore each produce specific alerts that must be addressed separately by the crew of the aircraft.

Furthermore, the procedure to be adopted is complex for the crew, when a first proximity alert created by the radar is emitted, followed by a second alert indicating presence in a shear zone, emitted by the enhanced ground proximity warning system.

SUMMARY OF THE INVENTION

An object of the invention is therefore to provide a piloting assistance system that is easy for the pilot to use, while adapting to the different evolution phases of the aircraft when approaching a zone comprising windshear and in such a zone.

To that end, a system of the aforementioned type is provided, characterized in that the guidance unit is able to automatically select a first guidance mode when a first alert indicating the approach by the platform toward a windshear zone is generated by the first detection assembly, and to automatically select at least one second guidance mode different from the first guidance mode when a second alert indicating the presence of the platform in the windshear zone is generated by the second detection assembly, the system comprising an information device able to display unified windshear alert information and/or unified information for implementation of a guidance mode, shared by the first alert and the second alert, irrespective of the detection assembly at the origin of said alert.

The system according to the invention may include one or more of the following features, considered alone or according to any technically possible combination(s):
- the guidance unit is able to switch automatically from the first guidance mode to the second guidance mode when the second detection assembly creates a second alert for the presence of the platform in a windshear zone.
- the first detection assembly and the second detection assembly are capable of being active at the same time.
- the information device is capable of producing a voice signal.
- the first detection assembly includes at least one radar sensor and the second detection assembly includes at least one anemometric and/or barometric sensor.
- the first detection assembly is a meteorological radar system, the second detection assembly being an enhanced ground proximity warning system (EGPWS)
- in the second guidance mode, the guidance unit is able to ensure vertical guidance and thrust guidance of the platform at the same time.
- in the first guidance mode, the guidance unit is able to guide the speed of the platform.
- the information device is able to display initial alert information in response to a first detection level of the first alert, then to display the unified windshear alert information in response to a second detection of the first alert, the information device being able to retain the display of the unified windshear alert information in response to the detection of the second alert.

A piloting assistance method for a platform is also provided, comprising the following steps:
- providing a system as defined above;
- monitoring by the first detection assembly of the approach of the platform near a windshear zone as a function of the data received from the first sensor;
- simultaneous monitoring by the second detection assembly of the presence of the platform in a windshear zone as a function of the data received from the second sensor;
- generating a first alert for the approach of the platform to a windshear zone by the first detection assembly and/or a second alert for the presence of the platform in a windshear zone by the second detection assembly;

selection, by the guidance unit, of a first guidance mode when a first alert for an approach of the platform near a windshear zone is created by the first detection assembly;

selection, by the guidance unit, of at least one second guidance mode separate from the first guidance mode when a second alert indicating the presence of the platform in a windshear zone is created by the second detection assembly, displaying unified windshear alert information and/or unified information for implementation of a guidance mode, shared by the first alert and the second alert irrespective of the detection assembly at the source of said alert.

The method according to the invention may comprise one or more of the following features, considered alone or according to any technically possible combination(s):

the method includes the automatic switching of the guidance unit from the first guidance mode to the second guidance mode, upon receipt of a second alert indicating the presence of the platform in a windshear zone created by the second detection assembly.

the method comprises the emission of an alert signal shared by the first alert indicating that the platform is approaching a windshear zone and the second alert indicating the presence of the platform in a windshear zone by an alert device.

BRIEF SUMMARY OF THE DRAWINGS

The invention will be better understood upon reading the following description, provided solely as an example, and done in reference to the appended drawings, in which.

DETAILED DESCRIPTION

Figure 1:
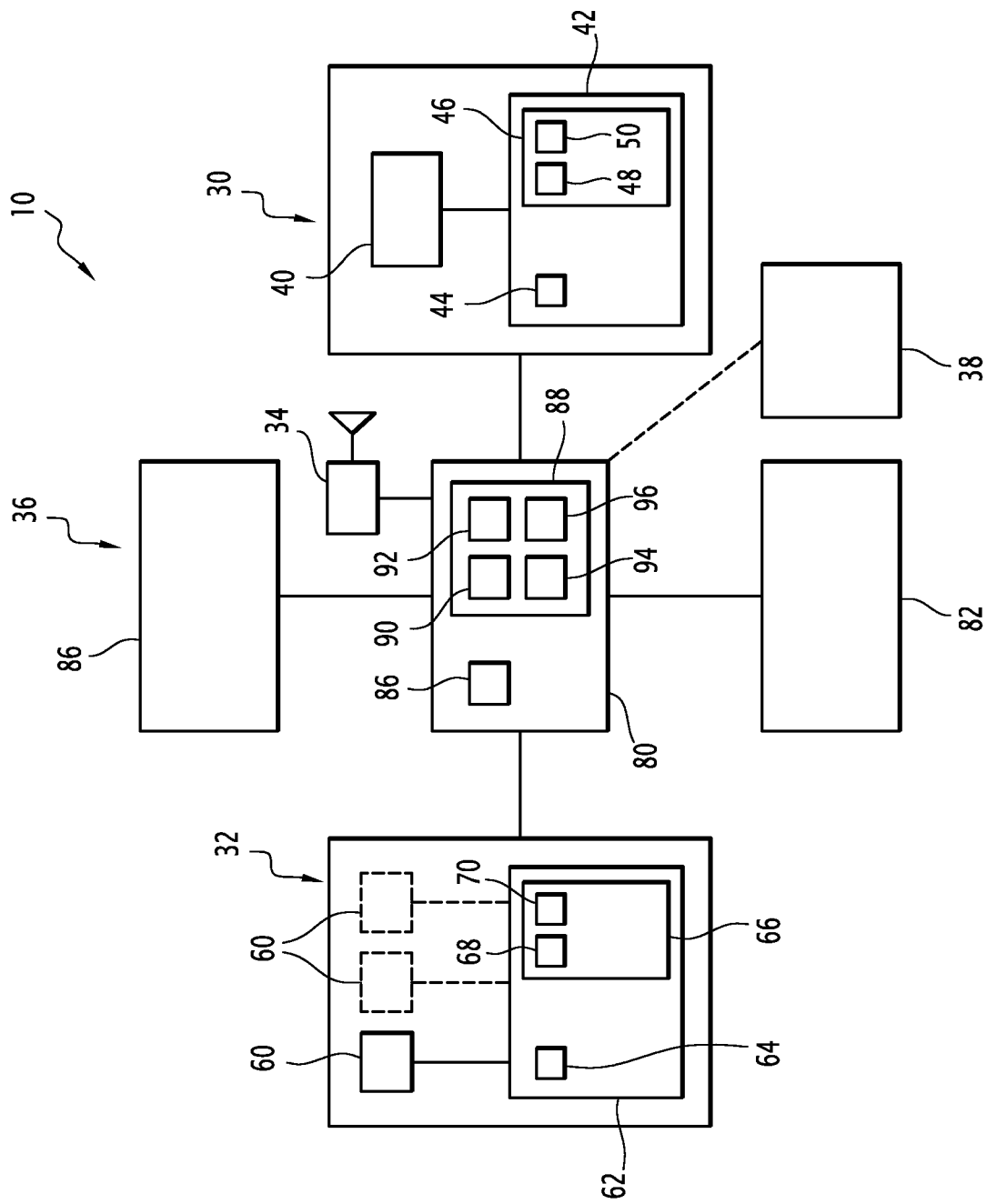
FIG. 1 is a diagrammatic view of a first piloting assistance system according to the invention.

A first piloting assistance system 10 according to the invention is diagrammatically shown in FIG. 1.

Figure 2:
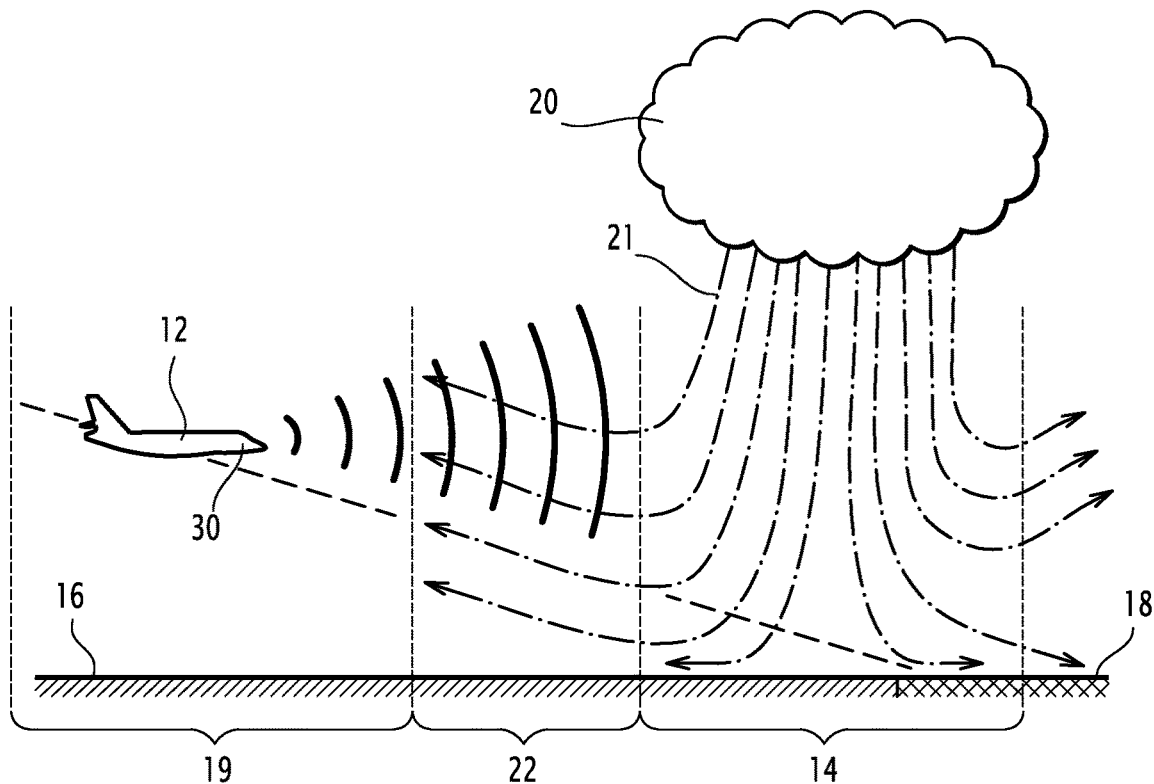
FIG. 2 is a side view of an aircraft provided with the system of FIG. 1, approaching a windshear zone.
Figure 3:
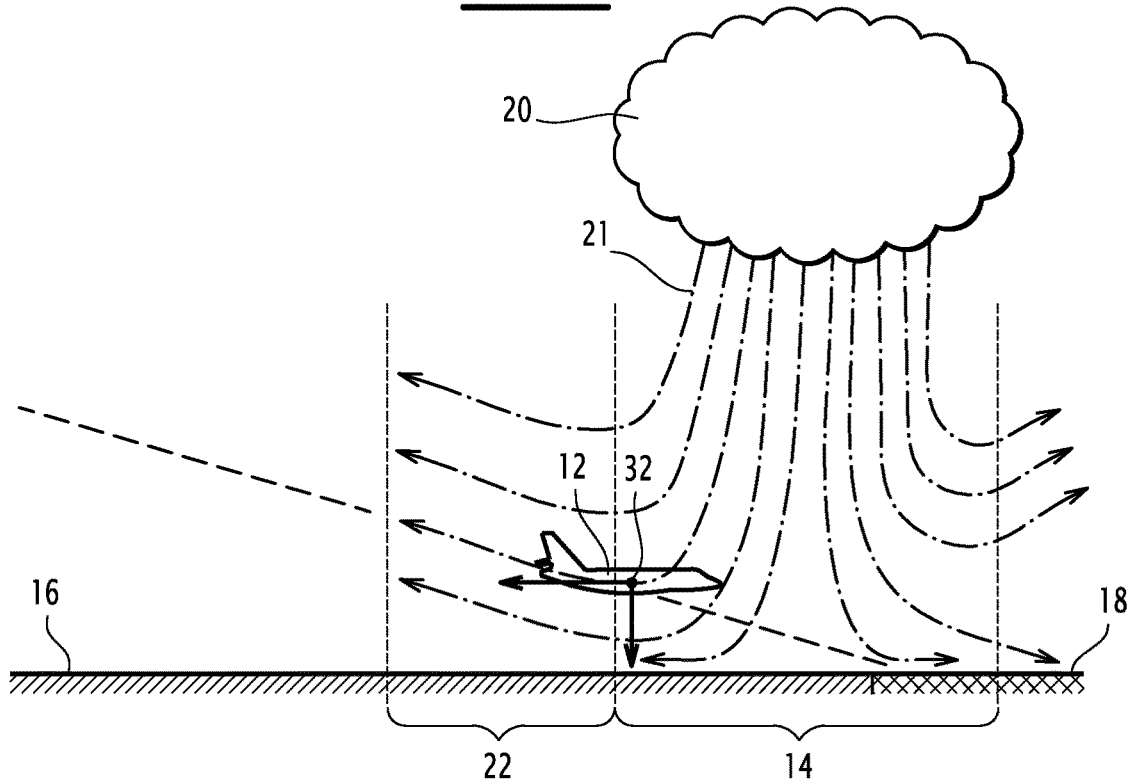
FIG. 3 is a view similar to FIG. 2, the aircraft being in the windshear zone.

The system 10 is designed to be placed in a flying platform 12, shown in FIGS. 2 and 3, to assist a pilot of the platform 12, near a windshear zone 14 and/or in such a zone 14.

The flying platform 12 is for example a civilian or military aircraft. Alternatively, the platform 12 is a drone.

A "windshear" is generally a difference in the speed or direction of the wind between two very close points of the atmosphere. The windshear is generally a combination of horizontal and vertical components of the wind.

In the example shown in FIGS. 2 and 3, the windshear is close to the ground 16, for example in a region situated near or across from a landing or takeoff runway 18, at an altitude for example below 1500 feet or 457 m.

The windshear zone 14 here is situated at a cloud 20, at a descending gust 21 coming from the cloud 20.

The zone 14 is surrounded by a peripheral zone 22 in which the winds are divergent at the ground. The abrupt change in direction of the wind between the peripheral zone 22 and the windshear zone 14 may cause an abrupt decrease in the lift the platform 12.

The windshear zone 14 for example has a horizontal length comprised between 2 km and 6 km.

The piloting assistance system 10 according to the invention is integrated into avionics systems of the platform 12.

In reference to FIG. 1, the system 10 includes a first assembly 30 for detecting the windshear, able to generate a first alert that the platform is approaching the windshear zone 14, and a second assembly 32 for detecting a windshear, able to generate a second alert indicating that the platform is present in the windshear zone 14.

The system 10 further includes an information device 34 shared by the first assembly 30 and the second assembly 32 and a unit 36 for guiding the platform 12, the information device 34 and the guiding unit 36 being connected to the assembly 30, 32 to receive the alerts.

The guidance unit 36 is able to implement guidance modes of the platform 12 based on the type of alert generated by the assembly 30, 32.

Advantageously, the system 10 further comprises an automatic pilot unit 38 connected to the guide unit 36.

The first detection assembly 30 includes at least one first detection sensor 40, and one first computer 42 for processing data received from the first sensor 40 in order to generate at least one first alert indicating that the platform 12 is approaching a windshear zone 14.

Advantageously, the first detection assembly 30 is a meteorological radar system. Such a system is for example marketed by the company Honeywell® under reference "Radar 4000".

The first sensor 40 is preferably a radar sensor, in particular a Doppler radar sensor.

The first computer 42 is able to process the data received from the first sensor 40 and create at least one alert indicating the approach near a windshear zone 14, based on data received from the first sensor 40. It includes a processor 44 and a memory 46 containing software modules able to be executed by the processor 44.

The memory 46 of the computer 42 contains a software module 48 for computing a piece of information representative of the wind variation in front of the platform 12, for example at a distance comprised between 0.5 and 5 nautical miles, i.e., between 0.9 km and 9.2 km from the zone 14 based on data received from the radar sensor.

Advantageously, the software module 48 is able to determine the horizontal and vertical speeds of the wind in front of the platform, as well as the variations in a predetermined spatial and angular range.

The memory 46 of the computer 42 further contains a module 50 for generating a first approach alert, from data received from the module 48.

The module 50 is for example able to determine the approach near a zone 14 in front of the platform 12, and the distance between the platform 12 and the zone 14.

One example of the module 50 is described in American patent U.S. Pat. No. 5,523,759. This module collects the Doppler scanning data according to a three-dimensional scan to obtain returned average speed and spectral range power data. Then, the module processes the data to determine a list of air masses of interest, compare them to a predetermined model, and monitor the evolution, step by step, of the position and spatial orientation of those air masses.

The first approach alert is for example generated at a given distance from the zone 14 identified using the software module 48, for example at a distance comprised between 0.5 and 3 nautical miles, i.e., between 0.9 km and 5.5 km, from the zone 14.

Advantageously, the first alert is made up of a first level in a zone 19 illustrated in FIG. 2 between 1.5 and 3 nautical miles, i.e., between 2.8 km and 5.5 km, from the zone 14, alerting the pilot without any obligation for immediate action, and a second level in the zone 22 between 0.5 and 1.5 nautical miles, i.e., between 0.9 km and 2.8 km, from the zone 14 with required immediate action.

The second detection assembly 32 includes at least one second detection sensor 60 separate from the first sensor 40, and a second computer 62 for processing data received from the second sensor 60, to create at least one second alert indicating the presence of the platform 12 in a windshear zone 14.

Advantageously, the second detection assembly 32 is an enhanced ground proximity warning sensor (EGPWS). Such a system is for example marketed by the company Honeywell® under the reference EGPWM.

In this example, the second detection assembly 32 preferably includes at least one second anemometric and barometric sensor 60. In one alternative, the second assembly 32 includes a plurality of second sensors 60, including at least one anemometric and barometric sensor, a satellite positioning sensor, and a positioning sensor such as an inertial sensor.

The second computer 62 is able to process the data received from each second sensor 60 and to create at least one second alert of the platform 12 in a windshear zone 14, based on data received from each second sensor 60. It includes a processor 64 and a memory 66 containing software modules able to be run by the processor 64.

In the example shown in FIG. 1, when the detection assembly 32 includes a second anemometric and barometric sensor 60, the memory 66 of the computer 62 contains a software module 68 for computing a piece of information representative of the variation of the airspeed at the platform 12 and/or a piece of information representative of the vertical speed of the platform, based on measurements received from the or each second sensor 60.

The memory 66 of the computer 62 further contains a software module 70 for generating an alert, from representative information received from the computation module 68.

A two-dimensional alert range for presence in a zone 14 is defined when the variation of the airspeed is negative and/or the vertical speed of the platform is negative below a predetermined threshold defining a limit of the range.

The generating module 70 is able to identify, each moment, whether the representative information received from the module 68 has values in the two-dimensional presence alert range, and to create a second alert indicating the presence of the platform 12 in a windshear zone 14 when the representative information is located in that range.

The guidance unit 36 includes a computer 80, able to compute and implement specific guidance modes based on the alerts created by the first detection assembly 30 and by the second detection assembly 32.

It further advantageously includes a man-machine interface 82 and a display screen 84.

In this example, the guide unit 36 is an instrument of the flight director type.

The computer 80 of the guidance unit 36 includes a processor 86 and a memory 88 containing software modules able to be executed by the processor 86.

The memory 88 of the computer 80 thus contains a software module 90 for receiving alerts received from the first detection assembly 30 and the second detection assembly 32, a software module 92 for generating a single windshear alert, and a software module 94 for automatic selection of the predefined guidance modes of the platform 12, depending on the type of alert created by the detection assemblies 30, 32 and a module 96 for activating the selected guidance mode.

The receiving module 90 is able to receive the alerts emitted by the first detection assembly 30 and the second detection assembly 32.

The generating module 92 is able to create a single shared windshear alert, upon receiving a first alarm indicating an approach near a zone 14, coming from the first detection assembly 30, a second alarm indicating presence of the platform 12 in the zone 14, coming from the second detection assembly 32, or a combination of a first alarm and a second alarm (the more critical of the two alarms having priority).

The generating module 92 is able to send the shared windshear alert to the information device 34.

Furthermore, the selection module 94 is able to automatically select a guidance mode of the platform 12, from among several guidance modes of the platform 12, based on the type of alert emitted by the first detection assembly 30 and the second detection assembly 32, as received by the receiving module 92.

According to the invention, the selection module 94 is able to automatically select a first guidance mode, when a first alert indicating an approach near the zone 14 is created by the first detection assembly 30.

The first guidance mode is selected by the selection module 94, when a first alert indicating the approach near the zone 14 is created for the first detection assembly 30, in the absence of a second alert indicating presence in a zone 14 created by the second detection assembly 32.

This first guidance mode corresponds either to guidance of the speed of the aircraft adapted to a go-around procedure (for example in a descent or landing phase) or guidance of the speed of the aircraft adapted to a takeoff procedure. To that end, the selection and activation module 94 is able to determine whether the platform 12 is on the ground or in flight so as to distinguish between the takeoff phase and a descent/landing phase.

The selection module 94 is further able to automatically select at least one second guidance mode, different from the first guidance mode, when a second alert indicating the presence of the platform 12 in a zone 14 is created for the second detection assembly 32.

The second guidance mode advantageously includes both vertical and thrust guidance of the platform 12. It is able to keep the platform 12 in a flight envelope preventing stalling while minimizing loss of altitude.

The activation module 96 can be activated manually by the pilot to implement the guidance mode selected by the selection module 94.

It is also able to switch automatically from the first guidance mode to the second guidance mode, without intervention by the crew, when the first guidance mode is active and a second alert indicating presence in the zone 14 is emitted. The activation module 96 is able to display, on the screen 84, evolution instructions corresponding to the guidance mode selected by the selection module 94 allowing the pilot to maneuver the platform in accordance with that guidance mode.

Alternatively, the activation module 96 is able, while displaying the evolution instructions corresponding to the selected guidance mode on the screen 84, to send the automatic pilot unit 38 evolution instructions corresponding to the selected guidance mode so that the unit 38 maneuvers the platform 12 in accordance with the selected guidance mode.

The screen 84 is for example a screen of a display of the cockpit of the platform. The evolution instructions can be displayed in at least one window on the screen 84.

The device 34 is able to display at least one piece of unified windshear alert information on the screen 84, said information here consisting of a single text alert message, shared by a first alert emitted by the first detection assembly 30 and a second alert emitted by the second detection assembly 32, indicating a windshear alert, without specifying whether it involves a first alert indicating the approach near the zone 14 or a second alert indicating the presence of the platform in a zone 14. This message is for example illustrated in FIG. 5 under reference 98, by the term "WINDSHEAR".

In this example, the message "WINDSHEAR" appears in a first color (for example, amber) to indicate the first level of the first alert.

It switches to a second color (for example, red) for the second level of the first alert.

According to the invention, the message remains identical (text and color) when the second alert is emitted. The displayed unified information is therefore shared here at the second level of the first alert and the second alert.

Advantageously, the information device 34 is able to create a voice windshear alert signal, shared by the first detection assembly 30 and the second detection assembly 32.

Figure 6:
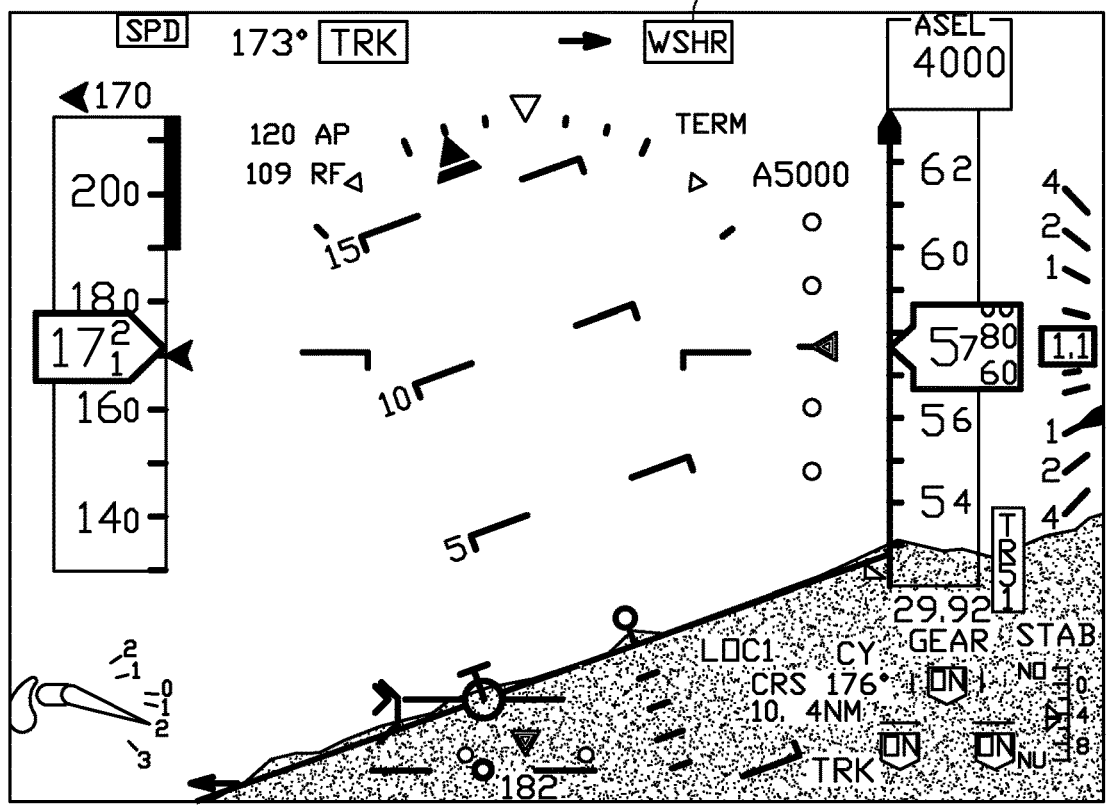

In this example, the information device 34 is also able to display, on the screen 84, at least one piece of unified information for implementing a guidance mode formed by a text message, irrespective of the emitted alert and irrespective of the guidance mode implemented. In the example of FIG. 6, the text message corresponding to the unified information for the implementation of a guidance mode is referenced 99 and here corresponds to the text "WSHR".

A piloting assistance method implemented in the platform 12 equipped with a system 10 according to the invention will now be described.

Figure 4:
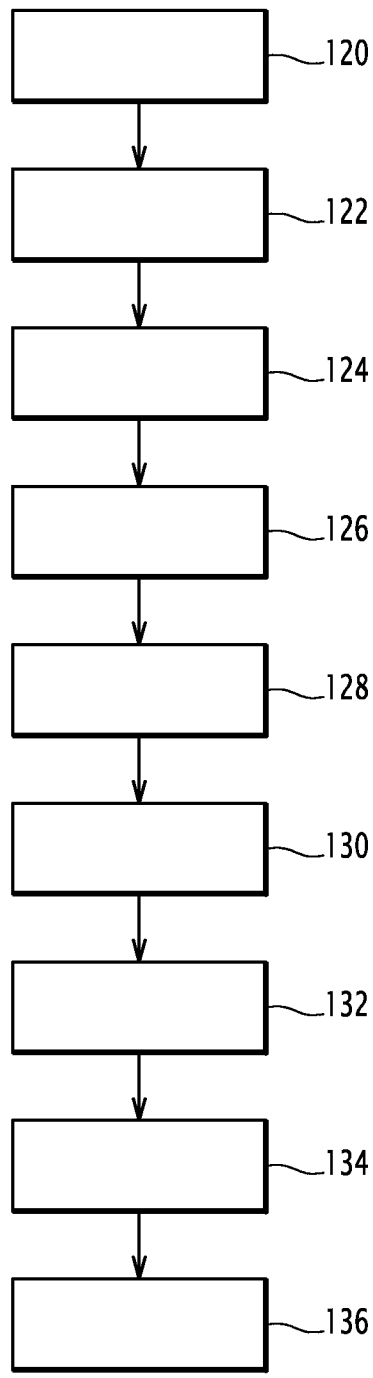
FIG. 4 is a flowchart showing the implementation of a piloting assistance method according to the invention.

As illustrated in FIG. 4, the method initially includes a step 120 for activating each detection assembly 30, 32.

In step 122, each detection assembly 30, 32 collects information using at least one sensor 40, 60. The data is processed by the respective computers 42, 62 to determine, at each moment, the approach of a windshear zone 14 and the presence of the platform 12 in a windshear zone 14, respectively.

In step 124, as illustrated in FIG. 2, the platform 12 approaches a windshear zone 14 and enters a peripheral zone 22.

Based on the data received from the first sensor 40, a first alert is created by the generating software module 50 of the first detection assembly 30.

Figure 5:
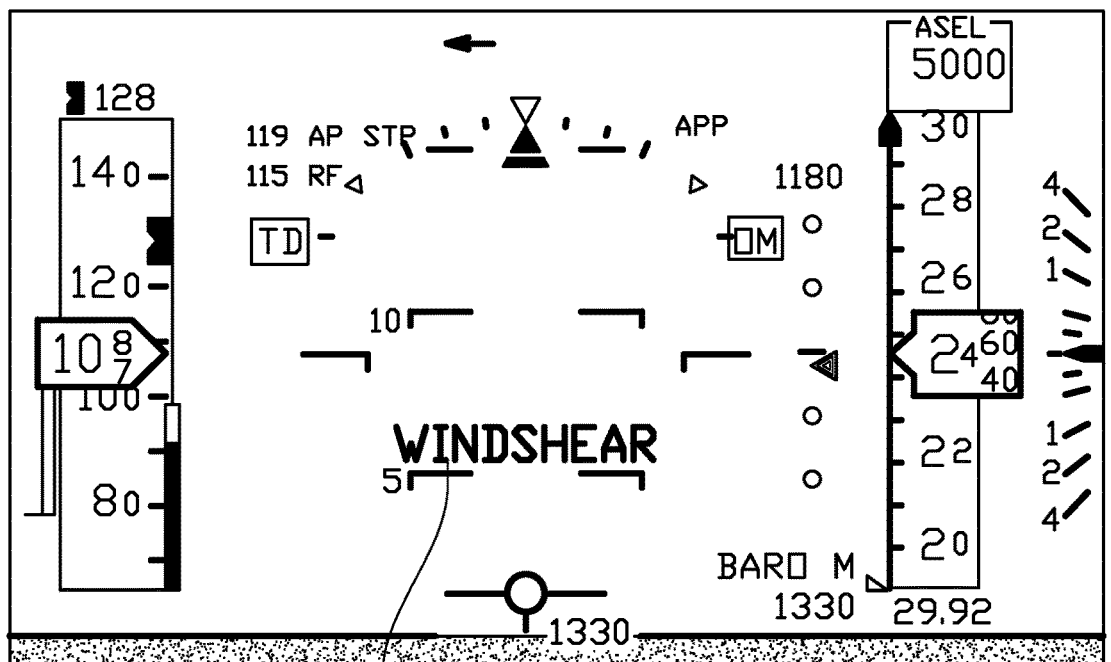
FIGS. 5 and 6 respectively show the display of a unified windshear alert and unified information for the windshear guidance mode during the implementation of the method according to the invention.

In step 126, the first alert is sent to the information device 34, which displays visual alert information displayed on the screen, for example a text message such as "WINDSHEAR", shown in FIG. 5, and advantageously an auditory alert signal.

In step 128, the guidance unit determines that a first alert indicating the approach of a zone 14 has been created by the first detection assembly 30, and checks that no alert indicating presence in a zone 14 has been created by the second detection assembly 32.

The selection module 94 also determines that the platform 12 is in a takeoff or landing phase. It therefore activates, after validation by the pilot, the first guidance mode corresponding to that phase (go-around or maintenance of speed).

In step 130, the pilot activates the guidance activation module using the man-machine interface 82, for example by pressing a dedicated button on that interface.

As previously indicated, the selection module 94 then displays, on the screen 84, guidance instructions allowing the pilot to maneuver the platform in accordance with the selected guidance mode.

In step 132, as illustrated in FIG. 3, the platform 12 enters the windshear zone 14.

In step 134, based on data received from the second sensor 60, a second alert indicating presence in the zone 14 is created by the software generating module 70 and is sent to the information device 34 and the guidance unit 36.

The information device 34 does not modify the alert information displayed on the screen, or the auditory alert, which remain the same as those implemented in step 126.

In step 136, without intervention by the pilot, the selection module 94 of the guidance unit 36 determines that a second alert indicating the presence of the platform 12 in the zone 14 has been created, independently of the generation of the first alert.

This second alert being more critical than the first alert, the activation module 96 therefore automatically switches (without new validation by the pilot) to the second guidance mode.

It advantageously sends vertical guidance and thrust instructions for the platform 12, which are displayed on the screen 84. These instructions make it possible to keep the platform 12 in a flight envelope preventing stalling while minimizing the loss of altitude.

The assistance system 10 according to the invention can therefore selectively detect whether the platform 12 is approaching a windshear zone 14 or if it is present in such a windshear zone 14. The system 10 automatically adapts the appropriate guidance mode to the relative position of the platform with respect to the zone 14.

Owing to the invention described above, the pilot's tasks remain very simple, since a single shared windshear alert is emitted, whether the platform 12 is approaching the windshear zone 14 or in the windshear zone 14.

Furthermore, the procedure to be followed by the pilot is very simple, since once the guidance unit is activated by a single button, the guidance unit 36 automatically determines the most appropriate guidance mode, based on the information received from each detection assembly 30, 32, without intervention by the pilot, and updates the guidance mode based on the type of alert created by each detection assembly 30, 32.

Alternatively, other types of sensors are used. For example, a Doppler LIDAR (Light Detection And Arranging) sensor is used as a supplement or replacement for the radar sensor 40.

Also alternatively, the information device 34 displays the unified alert information without displaying unified information for selecting the guidance mode. The device 34 then displays information specific to the implemented guidance mode.

Also alternatively, the alert device 34 displays information specific to each alert, and unified selection information for the guidance mode irrespective of the alert emitted and the guidance mode implemented.

In another alternative, the second alert and the second guidance mode are triggered directly, without going through the first alert, in particular when the first sensor 40 has not been able to detect the approach of a windshear zone 14.

More generally, the information device is able to display the unified windshear alert information and/or the unified information for implementation of a guidance mode, when the first alert is generated without generation of a second alert, when the second alert is generated without generation of the first alert, and/or when a first and second alert are simultaneously generated

What is claimed is:

1. A piloting assistance system of a platform, including:
    a first detector for detecting a windshear including at least one first sensor and one first computer configured to generate a first alert that the platform is approaching a windshear zone, based on data received from the first sensor;
    a second detector for detecting a windshear including at least one second sensor, separate from the first sensor, and a second computer configured to generate a second alert indicating the presence of the platform in the windshear zone, based on data received from the second sensor;
    a guider of the platform, the guider being configured to automatically select a first guidance mode when the first alert indicating the approach by the platform toward a windshear zone is generated by the first detector, and to automatically select at least one second guidance mode different from the first guidance mode when the second alert indicating the presence of the platform in the windshear zone is generated by the second detector; and
    an information device configured to display at least one piece of unified information in response to one or both of the first alert and the second alert irrespective of whether the first alert or the second alert initiated the display of at least one piece of unified information, the at least one piece of unified information being at least one of:
        a windshear alert generated in response to the first alert indicating the approach by the platform toward the windshear zone and/or to the second alert indicating the presence of the platform in the windshear zone, and
        a guidance mode alert generated in response to the selection of the first guidance mode or the second guidance mode.

2. The system as recited in claim 1 wherein the guider is configured to switch automatically from the first guidance mode to the second guidance mode when the second detection assembly creates the second alert for the presence of the platform in the windshear zone.

3. The system as recited in claim 1 wherein the first detection assembly and the second detection assembly are configured for being active at the same time.

4. The system as recited in claim 1 wherein the information device is configured for producing a voice signal.

5. The system as recited in claim 1 wherein the first detector includes at least one radar sensor and the second detector includes at least one anemometric and/or barometric sensor.

6. The system as recited in claim 5 wherein the first detector is a meteorological radar system, the second detector being an enhanced ground proximity warning system (EGPWS).

7. The system as recited in claim 1 wherein, in the second guidance mode, the guider is configured to ensure vertical guidance and thrust guidance of the platform at the same time.

8. The system as recited in claim 1 wherein, in the first guidance mode, the guider is configured to guide the speed of the platform.

9. The system as recited in claim 1 wherein the information device is configured to display an initial alert information in response to a first detection level of the first alert, then to display the windshear alert in response to a second detection of the first alert, the information device being configured to retain the display of the windshear alert in response to the detection of the second alert.

10. A piloting assistance method for a platform comprising:
    monitoring, by a first detector for detecting windshear, an approach of the platform near a windshear zone as a function of data received from a first sensor of the first detector;
    simultaneous monitoring, by a second detector for detecting windshear, the presence of the platform in the windshear zone as a function of data received from a second sensor;
    generating a first alert for the approach of the platform near the windshear zone by the first detector and/or a second alert for the presence of the platform in the windshear zone by the second detector;
    selecting, by a guider, a first guidance mode when the first alert for the approach of the platform near the windshear zone is created by the first detector;
    selecting, by the guider, at least one second guidance mode separate from the first guidance mode when the second alert indicating the presence of the platform in the windshear zone is created by the second detector; and
    displaying at least one piece of unified information in response to one or both of the first alert and the second alert irrespective of whether the first alert or the second alert initiated the display of at least one piece of unified information, the at least one piece of unified information being at least one of:
        a windshear alert generated in response to the first alert indicating the approach by the platform toward the windshear zone and/or to the second alert indicating the presence of the platform in the windshear zone, and
        a guidance mode alert generated in response to the selection of the first guidance mode or the second guidance mode.

11. The method as recited in claim 10 wherein the method includes automatically switching the guider from the first guidance mode to the second guidance mode, upon receipt of the second alert indicating the presence of the platform in the windshear zone created by the second detector.

12. The method as recited in claim 10 further comprising emitting an alert signal shared by the first alert indicating that the platform is approaching the windshear zone and the second alert indicating the presence of the platform in the windshear zone by an information device.

* * * * *